United States Patent
McNab et al.

(10) Patent No.: US 7,489,464 B1
(45) Date of Patent: Feb. 10, 2009

(54) SERVO WRITING A DISK DRIVE USING A SECONDARY ACTUATOR TO CONTROL SKEW ANGLE

(75) Inventors: Robert J. McNab, San Jose, CA (US); Siri S. Weerasooriya, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 91 days.

(21) Appl. No.: 11/050,508

(22) Filed: Feb. 2, 2005

(51) Int. Cl.
*G11B 21/02* (2006.01)

(52) U.S. Cl. ........................................... 360/75

(58) Field of Classification Search .................. None
See application file for complete search history.

(56) References Cited

U.S. PATENT DOCUMENTS

| | | | |
|---|---|---|---|
| 5,500,776 A | 3/1996 | Smith | |
| 5,781,381 A | 7/1998 | Koganezawa et al. | |
| 5,793,554 A | 8/1998 | Chainer et al. | |
| 5,796,558 A * | 8/1998 | Hanrahan et al. | 360/294.6 |
| 5,801,908 A | 9/1998 | Akiyama et al. | |
| 5,907,447 A | 5/1999 | Yarmchuk et al. | |
| 5,920,441 A | 7/1999 | Cunningham et al. | |
| 5,949,603 A | 9/1999 | Brown et al. | |
| 5,991,115 A | 11/1999 | Chainer et al. | |
| 6,005,738 A | 12/1999 | Chainer et al. | |
| 6,292,320 B1 | 9/2001 | Mason et al. | |
| 6,317,285 B1 | 11/2001 | Bi et al. | |
| 6,320,718 B1 * | 11/2001 | Bouwkamp et al. | 360/77.04 |
| 6,493,176 B1 | 12/2002 | Deng et al. | |
| 6,504,675 B1 | 1/2003 | Shukh et al. | |
| 6,519,107 B1 * | 2/2003 | Ehrlich et al. | 360/75 |
| 6,522,494 B1 | 2/2003 | Magee | |
| 6,538,836 B1 | 3/2003 | Dunfield et al. | |
| 6,542,326 B1 * | 4/2003 | Ell et al. | 360/78.05 |
| 6,631,046 B2 | 10/2003 | Szita et al. | |
| 6,633,451 B1 | 10/2003 | Chainer et al. | |
| 6,636,388 B2 | 10/2003 | Stefansky | |
| 6,680,810 B2 | 1/2004 | Shiraishi et al. | |
| 6,754,030 B2 | 6/2004 | Seng et al. | |
| 6,765,744 B2 * | 7/2004 | Gomez et al. | 360/75 |
| 6,771,443 B2 * | 8/2004 | Szita et al. | 360/51 |
| 6,778,348 B1 | 8/2004 | Carley | |
| 6,798,610 B1 | 9/2004 | Deng et al. | |
| 6,873,488 B2 * | 3/2005 | Teo et al. | 360/77.06 |
| 6,937,419 B2 | 8/2005 | Suk et al. | |

(Continued)

OTHER PUBLICATIONS

Koganezawa, et al., "A Flexural Piggyback Milli-Actuator for Over 5 Gbit/in2 Density Magnetic Recording", pp. 3908-3910, Sep. 1998, IEEE Transactions on Magnetics, vol. 32, No. 5.

*Primary Examiner*—K. Wong
(74) *Attorney, Agent, or Firm*—Howard H. Sheerin, Esq.

(57) ABSTRACT

A method of servo writing a plurality of servo sectors to a disk of a disk drive to define a plurality of data tracks is disclosed. The disk drive comprises the disk, an actuator arm, a head coupled to a distal end of the actuator arm, wherein the head comprises a read element and a write element. A voice coil motor (VCM) rotates the actuator arm about a pivot to actuate the head radially over the disk, and a secondary actuator adjusts a skew angle for the head while using the write element to write the servo sectors to the disk.

16 Claims, 8 Drawing Sheets

U.S. PATENT DOCUMENTS

| | | |
|---|---|---|
| 6,963,465 B1 | 11/2005 | Melkote et al. |
| 7,215,514 B1 | 5/2007 | Yang et al. |
| 2001/0040752 A1 | 11/2001 | Szita et al. |
| 2004/0061967 A1 | 4/2004 | Lee et al. |
| 2004/0160696 A1* | 8/2004 | Meyer .................... 360/77.05 |

* cited by examiner

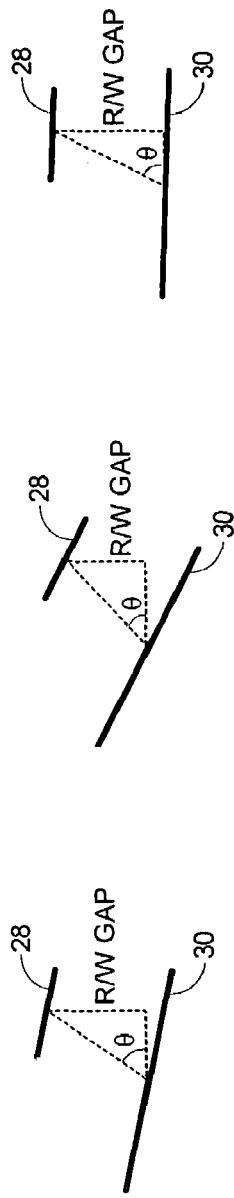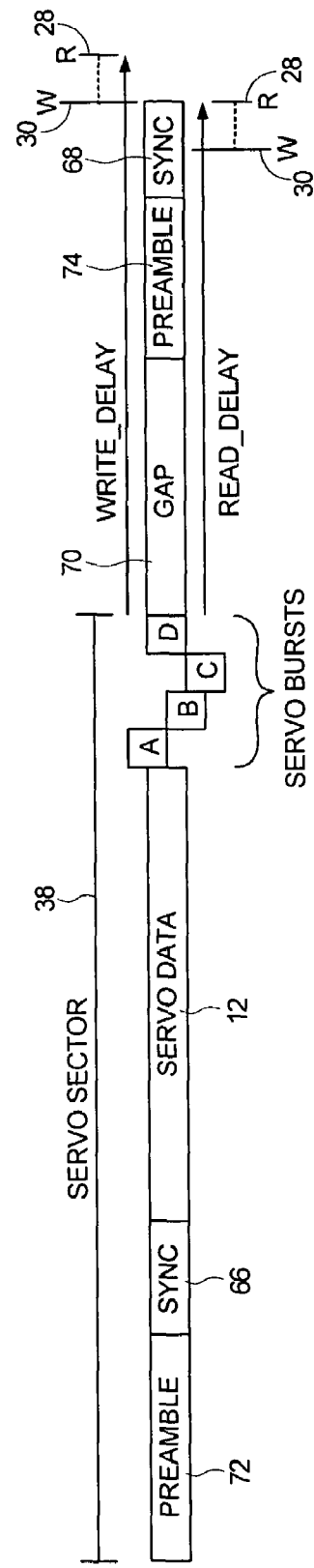

SERVO WRITING A DISK DRIVE USING A SECONDARY ACTUATOR TO CONTROL SKEW ANGLE

CROSS REFERENCE TO RELATED APPLICATIONS AND PATENTS

This application is related to co-pending U.S. patent application Ser. No. 10/971,215 entitled "METHOD OF OPERATING A DISK DRIVE INCLUDING ROTATING A PERPENDICULAR WRITE HEAD TO REDUCE A DIFFERENCE BETWEEN SKEW AND TAPER ANGLES, AND A DISK DRIVE" filed on Oct. 22, 2004, the disclosure of which is incorporated herein by reference.

BACKGROUND OF THE INVENTION

1. Field of the Invention

The present invention relates to disk drives. More particularly, the present invention relates to servo writing a disk drive using a secondary actuator to control skew angle.

2. Description of the Prior Art

Disk drives for computer systems comprise a disk for storing data and a head actuated radially over the disk for writing data to and reading data from the disk. To effectuate the radial positioning of the head over the disk, the head is connected to the distal end of an actuator arm which is rotated about a pivot by a rotary actuator (e.g., a voice coil motor (VCM)). The disk is typically divided into a number of concentric, radially spaced tracks, where each track is divided into a number of data sectors. The disk is typically accessed a data sector at a time by positioning the head over the track which comprises the target data sector. As the disk spins, the head writes transitions (e.g., magnetic transitions) in the data sector to record data, and during read operations senses the transitions to recover the recorded data.

Accurate reproduction of the recorded data requires the head to be positioned very close to the centerline of the target data sector during both write and read operations. Thus, accessing a target data sector involves positioning or "seeking" the head to the target track, and then maintaining centerline "tracking" while data is written to or read from the disk. A closed loop servo system typically performs the seeking and tracking operations by controlling the rotary actuator in response to position information generated from the head.

A well known technique for generating the head position control information is to record servo information in servo sectors disbursed circumferentially about the disk, "embedded" with the data sectors. This is illustrated in FIG. 1 which shows a disk 2 comprising a number of concentric data tracks 4 and a number of embedded servo sectors $6_0$-$6_N$. Each servo sector $6_i$ comprises a preamble 8, a sync mark 10, servo data 12, and servo bursts 14. The preamble 8 comprises a periodic pattern which allows proper gain adjustment and timing synchronization of the read signal, and the sync mark 10 comprises a special pattern for symbol synchronizing to the servo data 12. The servo data 12 comprises identification information, such as sector identification data and a track address. The servo control system reads the track address during seeks to derive a coarse position for the head with respect to the target track. The track addresses are recorded using a phase coherent Gray code so that the track addresses can be accurately detected when the head is flying between tracks. The servo bursts 14 in the servo sectors 6 comprise groups of consecutive transitions (e.g., A, B, C and D bursts) which are recorded at precise intervals and offsets with respect to the track centerline. Fine head position control information is derived from the servo bursts 14 for use in centerline tracking while writing data to and reading data from the target track.

The embedded servo sectors 6 are written to the disk 2 as part of the manufacturing process. Conventionally, an external servo writer has been employed which writes the embedded servo sectors 6 to the disks by processing each head disk assembly (HDA) in an assembly line fashion. The external servo writers employ very precise head positioning mechanics, such as a laser interferometer, for positioning the head at precise radial locations with respect to previously servo-written tracks so as to achieve very high track densities.

There are certain drawbacks associated with using external servo writers to write the embedded servo sectors 6 during manufacturing. Namely, the HDA is typically exposed to the environment through apertures which allow access to the disk drive's actuator arm and the insertion of a clock head which requires the servo writing procedure to take place in a clean room. Further, the manufacturing throughput is limited by the number of servo writers available, and the cost of each servo writer and clean room becomes very expensive to duplicate.

Attempts to overcome these drawbacks include a "self-servo writing" technique wherein components internal to the disk drive are employed to perform the servo writing function. Self-servo writing does not require a clean room since the embedded servo sectors are written by the disk drive after the HDA has been sealed. Further, self-servo writing can be carried out autonomously within each disk drive, thereby obviating the expensive external servo writer stations.

U.S. Pat. No. 5,949,603 discloses a technique for self-servo writing wherein the servo sectors are written relative to clock data disbursed around the disk and propagated from track to track. The clock data is first written to a "seed" track (e.g., at the inner diameter of the disk) from which the clock data as well as the servo sectors are propagated to the remaining tracks. The head is positioned over the seed track and, while reading the clock data in the seed track, the head is moved away from the seed track until the amplitude of the read signal decreases to some predetermined level. Then the clock data and servo sectors are written to the first track adjacent to the seed track. This process is repeated for the next and subsequent tracks until the embedded servo sectors have been written over the entire surface of the disk.

The radial offset between the read and write elements in magnetoresistive (MR) heads presents a problem when using the prior art technique of propagating servo sectors from track to track. Namely, when the head is positioned near the edge of the disk (inner or outer diameter depending on the geometry of the head) the resulting skew angle causes the write element to lag the read element in the direction of propagation. This lag renders it difficult for the read element to read the previously written servo track while writing the next servo track using the write element.

FIGS. 2A-2C illustrate another problem that manifests when servo writing the disk 2 using perpendicular magnetic recording. When writing the servo sectors $6_0$-$6_N$ from the inner diameter of the disk (FIG. 2A) toward the outer diameter of the disk (FIG. 2C), the skew angle of the head's write pole 16 as it approaches the outer diameter causes the inner corner of the write pole 16 to "swing out" and overwrite a band 18 of the previously written servo data. Similarly, when writing the servo sectors $6_0$-$6_N$ from the outer diameter of the disk (FIG. 2C) toward the inner diameter of the disk (FIG. 2A), the skew angle of the head's write pole 16 as it approaches the inner diameter causes the inner corner of the write pole 16 to "swing out" and overwrite a band 20 of the previously written servo data. The overwritten band (18 or 20) creates a "seam" between adjacent servo sectors, as well as a seam within each servo sector (including the servo bursts 14) if multiple revolutions are used to "stitch" together each servo sector $6_i$. The technique of "stitching" together a servo sector is typically necessary since the width of the write pole 16 is less than the width of a servo track requiring a portion (e.g., half) of a servo sector to be written during each revolution of the disk. The seams created by the overwrite problem illustrated in FIGS. 2A-2C induce errors in the position error signal generated when reading the servo bursts 14 as well as errors in detecting the servo data field 12, such as the Gray coded track addresses.

The prior art has suggested a number of techniques for addressing the overwrite problem when servo writing a disk drive using perpendicular magnetic recording. For example, U.S. Pat. No. 6,504,675 discloses a disk drive wherein the write pole has a trapezoidal shape in order to reduce the overwrite problem caused by the skew effect. However, the geometry of the trapezoidal shape varies between each disk drive due to tolerances in manufacturing the head, resulting in undesirable seams in the servo wedges for some percentage of the disk drives. In addition, manufacturing the write pole with a trapezoidal shape increases the manufacturing cost of the head, as well as reduces the surface area of the write pole leading to an undesirable decrease in the strength of the magnetic write flux.

U.S. Patent Application No. 2004/0061967 suggests an alternative solution to the overwrite problem by writing the servo sectors $6_0$-$6_N$ from the outer diameter of the disk to the middle diameter, and then from the inner diameter to the middle diameter. A problem with this technique, however, is the seam created near the middle diameter of the disk where the two segments of a servo wedge "meet". This seam becomes unusable (wasted) surface area, and the seek operation in the servo system must also account for the seam. This problem is exacerbated due to the disk expanding during the servo writing operation requiring a predetermined margin (wider seam) to account for the worst case deviation in the expansion.

There is, therefore, a need to overcome the problems associated with the skew angle of the head when servo writing a disk drive.

SUMMARY OF THE INVENTION

The present invention may be regarded as a disk drive comprising a disk, an actuator arm, and a head coupled to a distal end of the actuator arm, wherein the head comprises a read element and a write element. A voice coil motor (VCM) rotates the actuator arm about a pivot to actuate the head radially over the disk, and a secondary actuator adjusts a skew angle of the head. Control circuitry writes a plurality of servo sectors to the disk to define a plurality of data tracks. The control circuitry controls the VCM to move the head radially across the disk, and controls the secondary actuator to achieve a desired skew angle for the head while using the write element to write the servo sectors to the disk.

In one embodiment, the control circuitry controls the secondary actuator so that the write element leads the read element as the head moves radially across the disk. In one embodiment, the disk controller uses the read element to read previously written servo data in a first servo track to generate servo control information for controlling the VCM to position the write element over a second servo track.

In another embodiment, the head is coupled to the actuator arm by a suspension and the secondary actuator rotates the suspension about a pivot.

In yet another embodiment, the control circuitry calibrates a control signal applied to the secondary actuator and a corresponding change in the skew angle of the head.

In still another embodiment, the read element is radially offset from the write element, and in one embodiment, the control circuitry measures the radial offset between the read element and the write element.

In another embodiment, the control circuitry adjusts a control signal applied to the secondary actuator to achieve a target radial offset between the read element and the write element. In one embodiment, the read element is separated from the write element along the length of a servo track forming a read/write gap, and the control circuitry adjusts a control signal applied to the secondary actuator to achieve a target read/write gap.

In yet another embodiment, the control circuitry adjusts a control signal applied to the secondary actuator to maintain a substantially constant skew angle while moving the head radially across the disk to achieve a substantially constant track density. In another embodiment, the control circuitry adjusts a control signal applied to the secondary actuator to vary the skew angle while moving the head radially across the disk to achieve a variable track density.

The invention may also be regarded as a method of servo writing a plurality of servo sectors to a disk of a disk drive to define a plurality of data tracks. The disk drive comprises the disk, an actuator arm, and a head coupled to a distal end of the actuator arm, wherein the head comprises a read element and a write element. A voice coil motor (VCM) rotates the actuator arm about a pivot to actuate the head radially over the disk, and a secondary actuator adjusts a skew angle for the head while using the write element to write the servo sectors to the disk.

BRIEF DESCRIPTION OF THE DRAWINGS

FIGS. 6A-6C illustrate how the read/write gap between the read and write elements changes relative to the skew angle of the head.

FIG. 7 illustrates a technique according to an embodiment of the present invention for measuring the read/write gap between the read and write element which provides feedback for controlling the desired skew angle for the head.

DESCRIPTION OF THE PREFERRED EMBODIMENTS

Figure 3A:
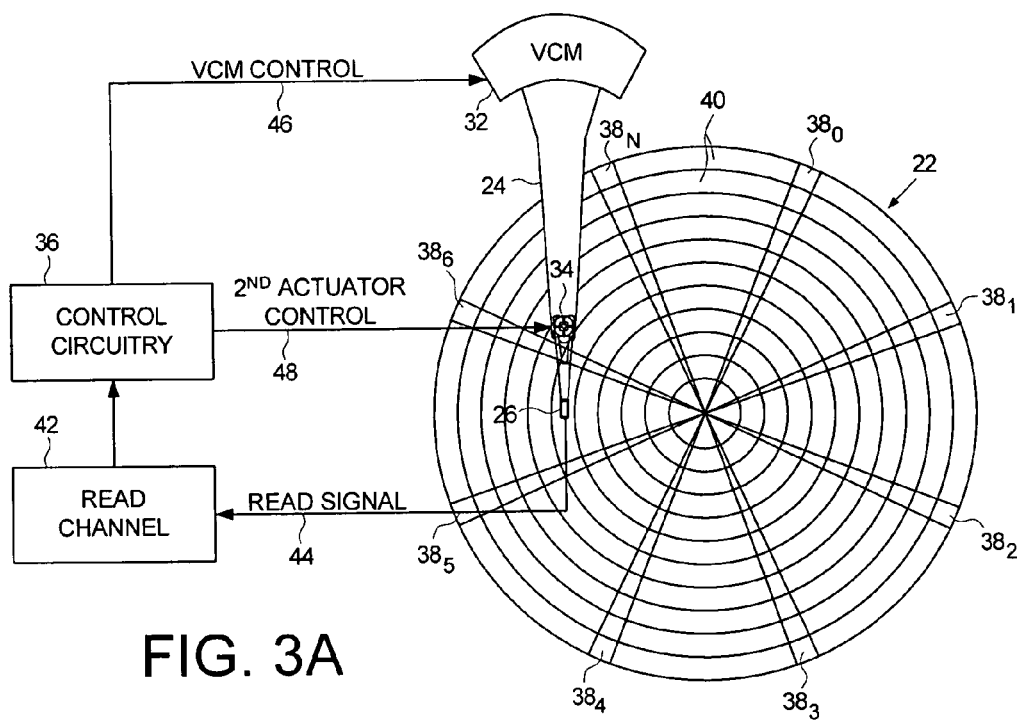
FIG. 3A shows a disk drive according to an embodiment of the present invention comprising a voice coil motor (VCM) actuator for actuating the head radially over the disk and a secondary actuator for adjusting a skew angle of the head while writing the servo sectors to the disk.
Figure 3B:
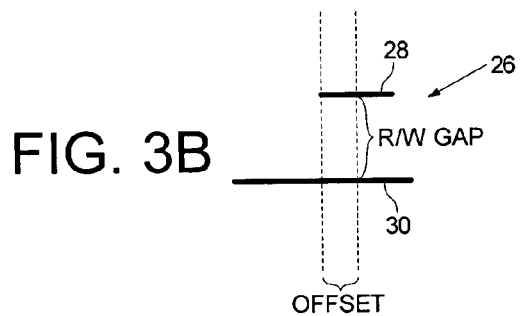
FIG. 3B shows a head according to an embodiment of the present invention comprising a read element and a write element which are offset radially and separated by a read/write gap.

FIG. 3A shows a disk drive comprising a disk 22, an actuator arm 24, and a head 26 coupled to a distal end of the actuator arm 24, wherein the head 26 comprises a read element 28 and a write element 30 (FIG. 3B). A voice coil motor (VCM) 32 rotates the actuator arm 24 about a pivot to actuate the head 26 radially over the disk 22, and a secondary actuator 34 adjusts a skew angle of the head 26. Control circuitry 36 writes a plurality of servo sectors $38_0$-$38_N$ to the disk 22 to define a plurality of data tracks 40. The control circuitry 36 controls the VCM 32 to move the head 26 radially across the disk 22, and controls the secondary actuator 34 to achieve a desired skew angle for the head 26 while using the write element 30 to write the servo sectors $38_0$-$38_N$ to the disk 22.

The disk drive in the embodiment of FIG. 3A comprises a read channel 42 for processing the read signal 44 emanating from the head 26. In one embodiment, the read channel 42 comprises suitable circuitry for processing the read signal 44 to generate a position error signal (PES) representing the actual radial location of the head 26. The PES is processed by the control circuitry 36 to generate a VCM control signal 46 applied to the VCM 32 in order to maintain the head 26 over the target radial location while writing the servo sectors $38_0$-$38_N$ to the disk 22. The read channel 42 may also comprise circuitry for measuring the actual skew angle of the head 26 which is processed as feedback by the control circuitry 36 to generate a control signal 48 applied to the secondary actuator 34 to maintain a target skew angle for the head 26.

Figure 3C:
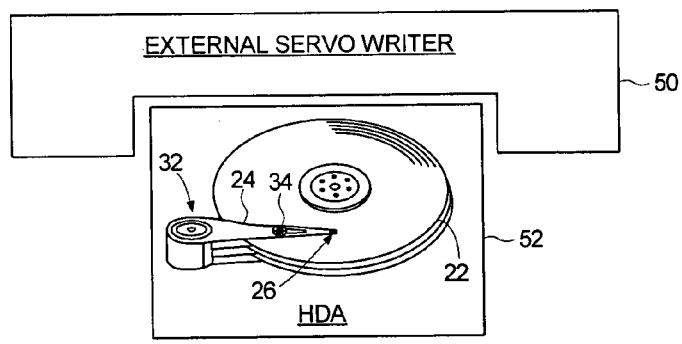
FIG. 3C shows an embodiment of the present invention wherein an external servo writer controls the secondary actuator to adjust the skew angle of the head while writing the servo sectors to the disk.

In an alternative embodiment shown in FIG. 3C, an external servo writer 50 controls the secondary actuator 34 to achieve a desired skew angle for the head 26 while using the write element 30 to write the servo sectors $38_0$-$38_N$ to the disk 22. In one embodiment, the external servo writer 50 inserts a push pin through an aperture of the head disk assembly (HDA) 52 of the disk drive for controlling movement of the actuator arm 24 and controls the secondary actuator 34 through an electrical interface. In an alternative embodiment, the external servo writer 50 may control movement of the actuator arm 24 by controlling the VCM 32 through an electrical interface. In one embodiment, the external servo writer 50 comprises an external motion sensor, such as a laser interferometer, for detecting the radial location of the head 26 (feedback), and in an alternative embodiment the external servo writer 50 processes the read signal 44 emanating from the head 26 to detect the radial location of the head 26. The external servo writer 50 may also determine the skew angle of the head 26 using an external motion sensor or by processing the read signal 44.

Figure 4:
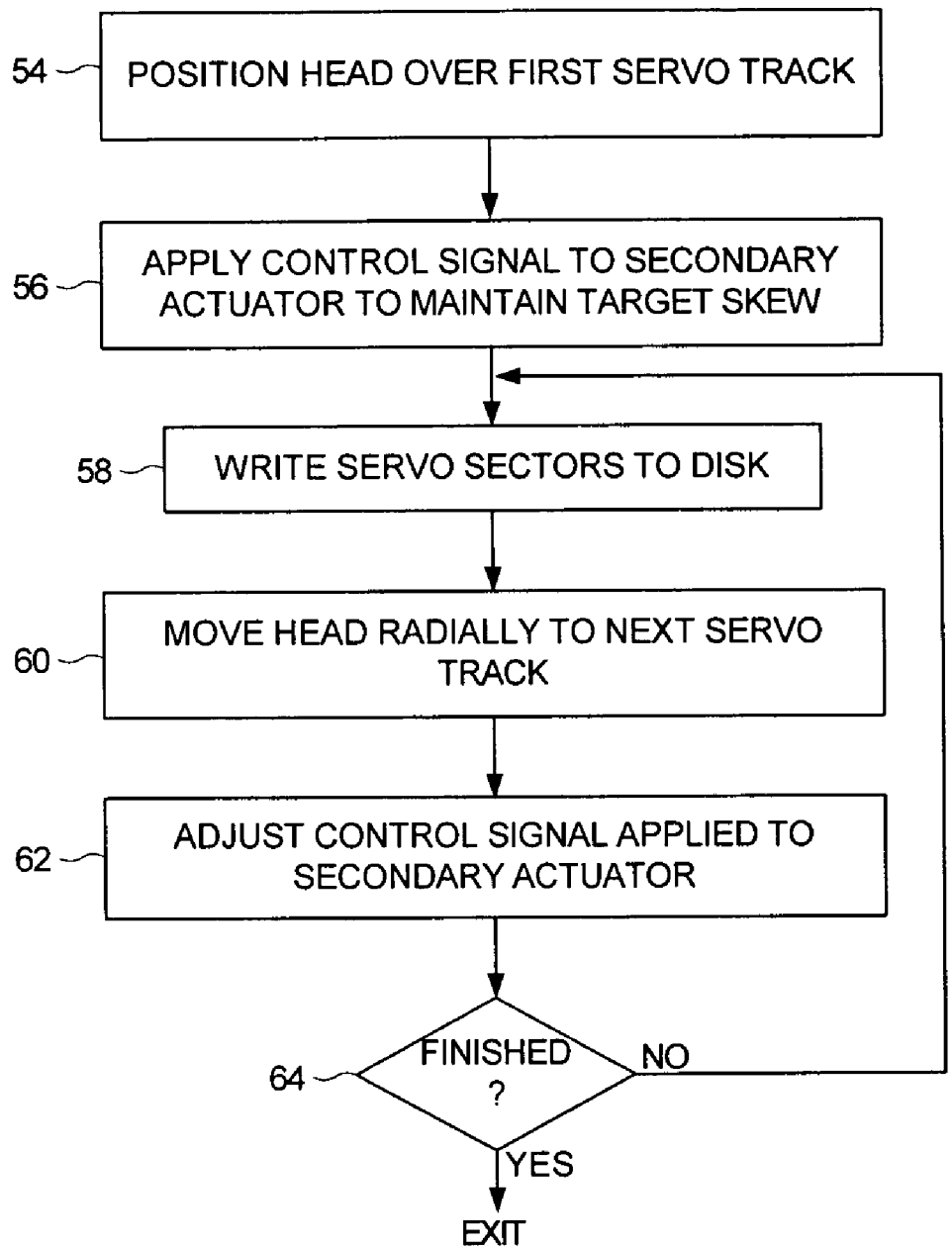
FIG. 4 is a flow diagram according to an embodiment of the present invention for writing the servo sectors to the disk.

FIG. 4 is a flow diagram according to an embodiment of the present invention for writing the servo sectors $38_0$-$38_N$ to the disk 22. The flow diagram may be executed by the control circuitry 36 internal to the disk drive during a self-servo writing operation, or executed by the external servo writer 50 of FIG. 3C. At step 54 the head 26 is positioned over a first servo track (e.g., using the VCM 32 or a push pin of the external servo writer 50), and at step 56 a control signal is applied to the secondary actuator 34 to maintain a target skew angle for the head 26. At step 58 the servo sectors are written to the disk 22 for the current servo track, at step 60 the head 26 is moved radially to the next servo track, and at step 62 the control signal applied to the secondary actuator 34 is adjusted (to maintain the target skew angle). Steps 58-62 are repeated until at step 64 the entire disk drive has been servo written.

Figure 5:
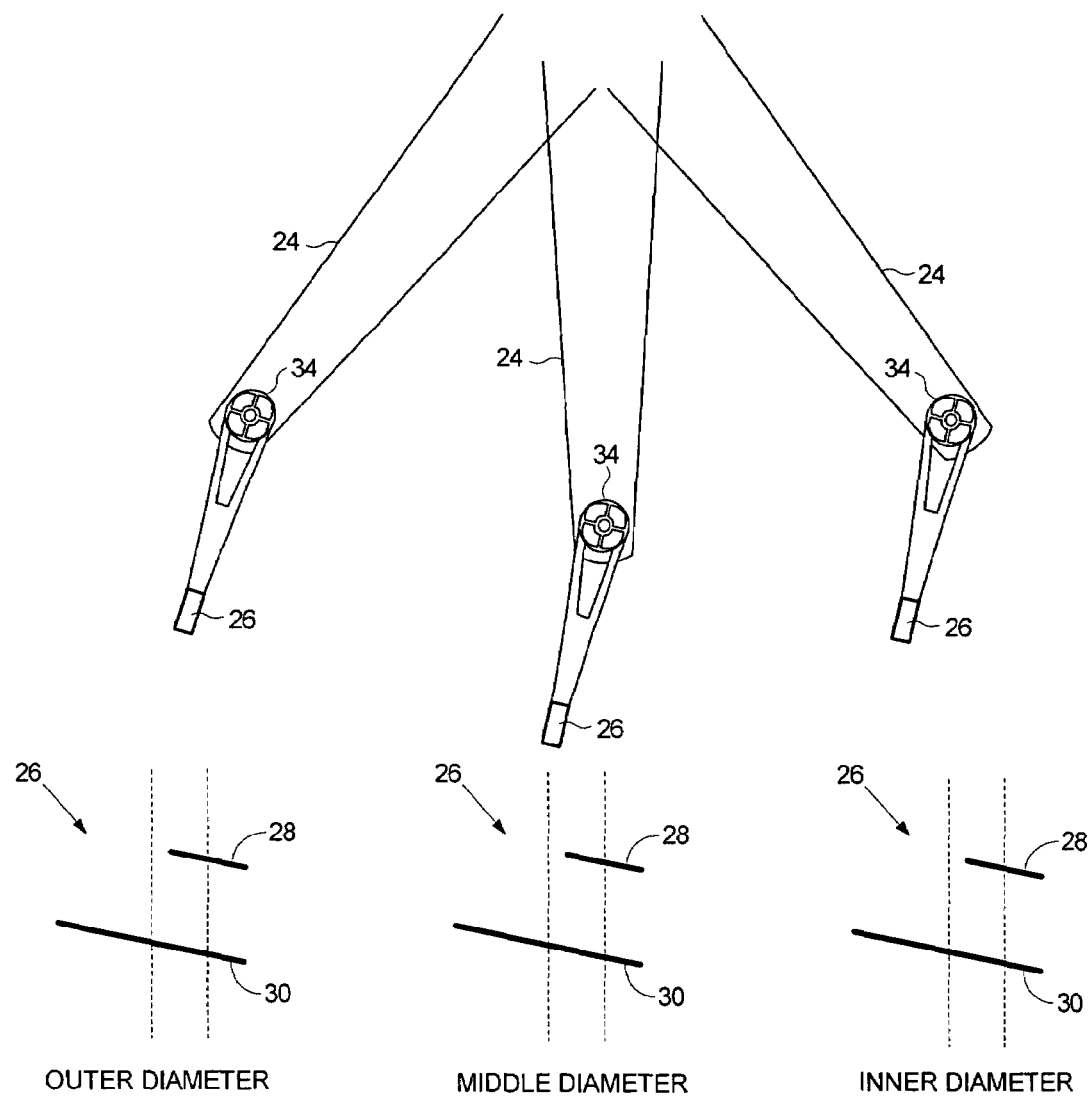
FIG. 5 illustrates how the skew angle of the head is controlled so that the write element leads the read element while self-servo writing the servo sectors from the inner to outer diameter of the disk using propagation.

FIG. 5 illustrates how the secondary actuator 34 is controlled to maintain a target skew angle for the head 26 as the actuator arm 24 is rotated to position the head radially over the disk 22 (e.g., from the inner diameter to the outer diameter) during the servo writing operation. In one embodiment, the servo sectors are written by propagating the servo data (and timing data) from track to track. A seed track is first written to the disk, for example, using an external servo writer or while pressing the actuator arm 24 against a crash stop. The read element 28 is then used to read the seed track while the write element 30 writes the servo data (and timing data) to the next servo track. This processes is then repeated for the next servo track until the servo data (and timing data) are propagated across the surface of the disk 22.

As shown in FIG. 5, adjusting the skew angle of the head 26 creates a radial offset between the read element 28 and the write element 30 which allows the write element 30 to write the servo data to the next servo track while the read element 28 reads the servo data from the previously written servo track. In one embodiment, the secondary actuator 34 is controlled so that the write element 30 leads the read element 28 as the head 26 moves radially across the disk 22 to facilitate propagating the servo data. In the embodiment shown in FIG. 5, the servo sectors are propagated from the inner diameter to the outer diameter of the disk 22 (right to left) and the secondary actuator 34 controlled so that the write element 30 always leads the read element 28.

In one embodiment, adjusting the skew angle of the head 26 creates an offset between the read element 28 and the write element 30 that is less than the width of a servo track. The position error signal (PES) for controlling the VCM 32 is generated by moving the head 26 radially until the amplitude of the read signal 44 reaches a target amplitude. In an alternative embodiment, adjusting the skew angle of the head 26 creates an offset between the read element 28 and the write element 30 that equals the width of a servo track (or integer multiple thereof). This embodiment allows the read element 28 to read the center of a previously written servo track while writing the servo sectors to the next servo track so that the PES for controlling the VCM 32 can be generated by processing the servo bursts in the previously written servo track using a conventional servo algorithm.

Any suitable secondary actuator 34 may be employed that provides the necessary stroke to achieve the desired skew angle for the head 26. The secondary actuator preferably exhibits a DC response so that the target skew angle can be maintained while writing the servo sectors to the disk. In one embodiment, the secondary actuator 34 is electro-magnetic such as the secondary actuator disclosed in U.S. Pat. No. 6,636,388 the disclosure of which is incorporated herein by reference. In addition, the secondary actuator 34 may be configured in any suitable manner to achieve the desired skew angle for the head 26. In the embodiment shown in FIG. 3A, the head 26 is coupled to the actuator arm 24 by a suspension, and the secondary actuator 34 rotates the suspension about a pivot. In an alternative embodiment, the head 26 is coupled to the suspension through a gimbal which is rotated about a pivot by the secondary actuator.

In the embodiment shown in FIG. 3B, the read element 28 is radially offset from the write element 30 when the skew angle of the head 26 is zero. The offset may be by design or due to tolerances in manufacturing the head 26 which is typical for magnetoresistive (MR) heads. Since the radial offset between the read element 28 and write element 30 is modified by adjusting the skew angle of the head 26, in one embodiment the inherent radial offset between the read element 28 and write element 30 is first measured to determine the appropriate skew angle that will achieve the target radial offset. Any suitable technique may be employed for measuring the inherent radial offset between the read and write element, such as the technique disclosed in U.S. Pat. No. 6,317,285 the disclosure of which is incorporated herein by reference.

In one embodiment, the control signal applied to the secondary actuator 34 and the corresponding change in the skew angle of the head 26 is calibrated for each disk drive. The skew angle may be measured using any suitable technique, including a motion sensor integrated into an external servo writer. In another embodiment, the read signal 44 generated by the head 26 is evaluated to measure the skew angle as described below with reference to FIGS. 6A-6C. In one embodiment, the skew angle at the outer diameter and inner diameter of the disk due to the stroke of the actuator arm 24 is measured. The control signal applied to the secondary actuator 34 is then adjusted open loop during the servo writing process to account for the change in skew angle due to the changing radial location of the head 26.

In an alternative embodiment, the skew angle of the head 26 is measured during the servo writing process to generate a feedback signal that is compared to a target skew angle. The difference between the measured and target skew angle is used to adjust the control signal 48 applied to the secondary actuator 34 in a closed loop system. Any suitable technique may be employed to measure the skew angle for generating the feedback signal. In one embodiment, the read element 28 is separated from the write element 30 along the length of a servo track forming a read/write (R/W) gap (FIG. 3B). As illustrated in FIGS. 6A-6B, the R/W gap changes as a function of the skew angle of the head 26; accordingly, the skew angle can be estimated by measuring the R/W gap. In one embodiment, the control signal applied to the secondary actuator 34 is adjusted to achieve a target read/write gap in order to achieve the target skew angle.

FIG. 7 illustrates a suitable technique for measuring the R/W gap by measuring write/read delays relative to a first and second sync mark. In the embodiment of FIG. 7, the first sync mark 66 is part of a servo sector 38, and the second sync mark 68 is written a predetermined interval following the servo sector forming a gap 70. A first preamble 72 precedes the first sync mark 66 and a second preamble 74 precedes the second sync mark 68. In the embodiment of FIG. 7, the disk 22 is rotating such that the head 26 is effectively moving from left to right over the track, and in this configuration, the read element 28 is "in front" of the write element 30 such that the write element 30 "lags" the reader 28 by the R/W gap as the track passes under the head 26. Since the read element 28 detects the first sync mark 66 and the second sync mark 68, the write delay and the read delay are measured relative to the read element 28. In the example of FIG. 7, the write delay begins at the end of the first sync mark 66 (relative to the read element 28) and ends after writing the second sync mark 68 (when the write element 30 has finished writing the second sync mark 68). The read delay begins at the end of the first sync mark 66 and ends when the read element 28 reaches the end of the second sync mark 68. In this embodiment, the R/W gap is estimated by subtracting the measured read delay from the measured write delay.

Figure 8:
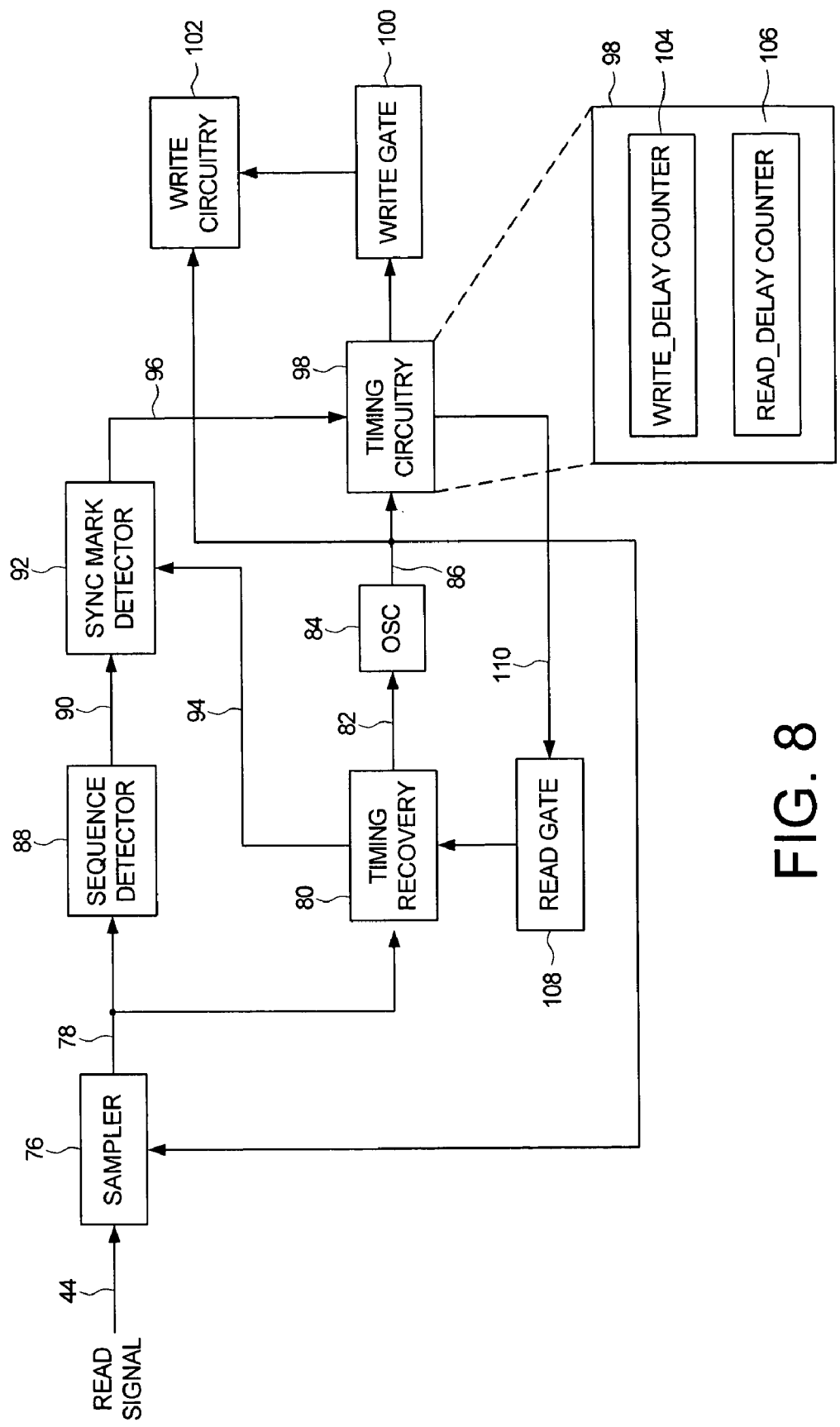
FIG. 8 shows circuitry according to an embodiment of the present invention for measuring the read/write gap between the read and write element.

FIG. 8 shows circuitry according to an embodiment for measuring the R/W gap which may be implemented within the disk drive or alternatively in the external servo writer 50. The circuitry comprises a sampling device 76 for sampling the read signal 44 emanating from the head 26 to generate a sequence of signal samples 78. Timing recovery 80 processes the signal samples 78 to generate a timing control signal 82 applied to an oscillator 84. The oscillator 84 outputs a clock 86 used to control the frequency of the sampling device 76. The timing recovery 80 adjusts the frequency of the clock 86 until the read signal 44 is sampled synchronously (thereby synchronizing the cycling of the clock 86 when reading the first preamble 72 and the second preamble 74). A sequence detector 88 processes the signal samples 78 to detect an estimated sequence 90, and a sync mark detector 92 evaluates the estimated sequence 90 to detect the first sync mark 66 and the second sync mark 68. The timing recovery 80 generates a control signal 94 for enabling the sync mark detector 92 when the sync marks are expected to occur in the estimated sequence 90.

During a first revolution when writing the second preamble 74 and second sync mark 68 to measure the write delay, the sync mark detector 92 generates a control signal 96 when the first sync mark 66 is detected. Timing circuitry 98 responds to the sync mark detect signal 96 by enabling a write gate 100 at the appropriate time. The write gate 100 enables write circuitry 102 to start writing the second preamble 74 and second sync mark 68. The timing circuitry 98 comprises a write delay counter 104 for counting a number of the clock cycles 86 relative to the first sync mark 66 until the second sync mark 68 has been written to the disk 22.

During a second revolution when reading the second preamble 74 and second sync mark 68 to measure the read delay, the sync mark detector 92 generates a control signal 96 when the first sync mark 66 is detected. The timing circuitry 98 responds to the sync mark detect signal 96 by enabling a read delay counter 106 and enabling a read gate 108 over line 110 at the appropriate time relative to the clock 86 as the head 26 approaches the second preamble 74. The read gate 108 enables the timing recovery 80 to start synchronizing to the second preamble 74, and the timing recovery 80 enables the sync mark detector 92 as the head 26 approaches the second sync mark 68. The read delay counter 106 counts a number of the clock cycles 86 until the second sync mark 68 is detected by the sync mark detector 92. The contents of the write delay counter 104 and read delay counter 106 represents the write delay and read delay for estimating the R/W gap.

In the embodiment of FIG. 8, the clock 86 is used to clock the write circuitry 102 when writing the second preamble 74 and second sync mark 68 to the disk 22. In this manner the second preamble 74 and second sync mark 68 are written substantially synchronous (in frequency and phase) with the first preamble 72 and the first sync mark 66. In an alternative embodiment, a separate write clock is used to clock the write circuitry 102 while writing the second preamble 74 and second sync mark 68 to the disk 22.

The embodiment of FIG. 8 generates the clock 86 by synchronously sampling the read signal 44, that is, by adjusting the frequency of the clock 86 until the sampling device 76 samples the read signal 44 synchronously. In alternative embodiment, interpolated timing recovery is employed wherein the read signal 44 is sampled asynchronously and synchronous signal samples derived from the asynchronous signal samples. In this embodiment, the interpolated timing recovery also comprises circuitry for generating the clock 86 synchronously for writing/reading the second preamble 74 and second sync mark 68. The details of interpolated timing recovery are well known and not disclosed herein so as not to obscure the embodiments of the present invention.

Figure 9:
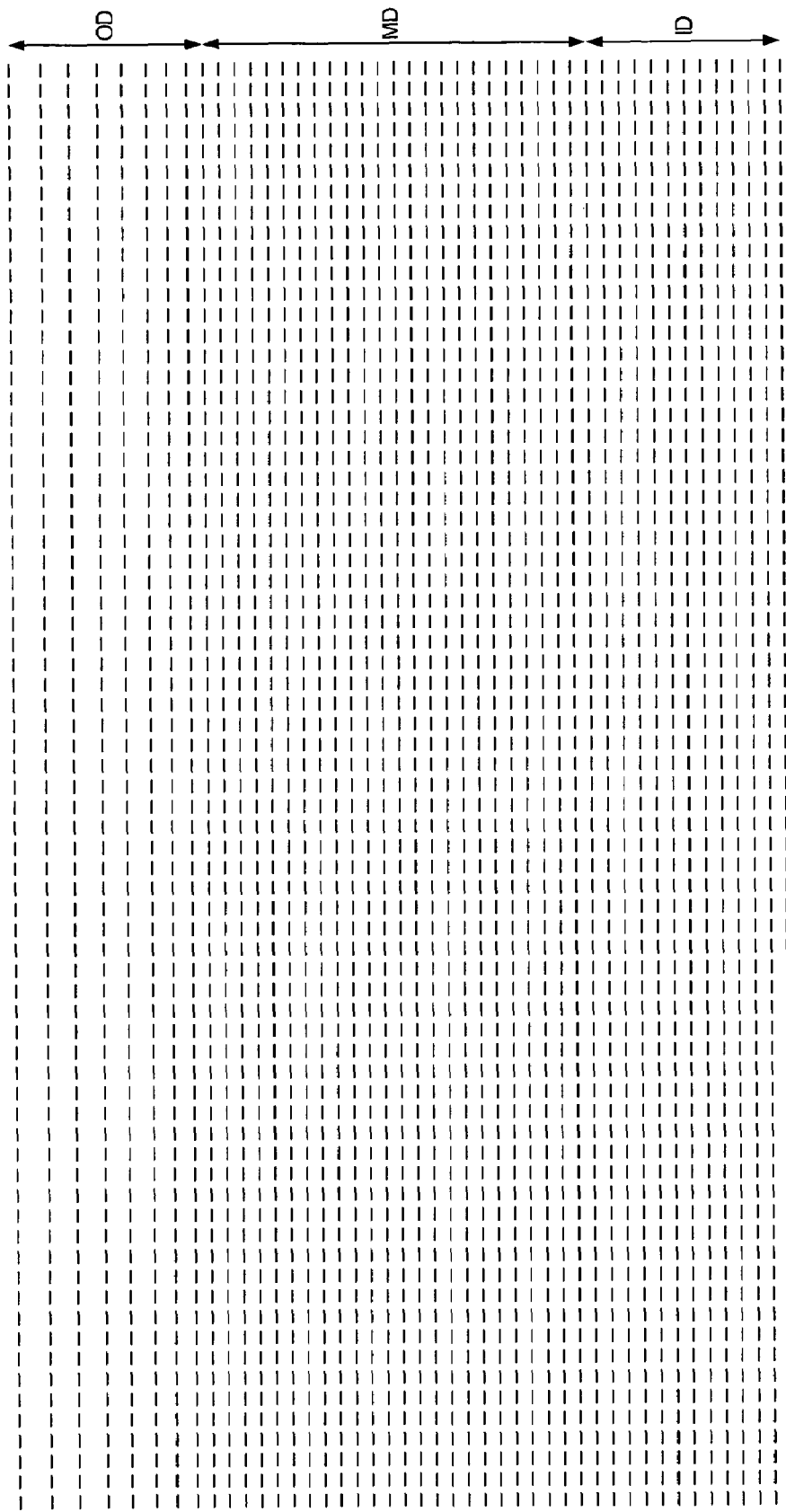
FIG. 9 illustrates an embodiment of the present invention wherein the skew angle of the head is adjusted to achieve a variable track density.

In one embodiment, the control signal applied to the secondary actuator 34 is adjusted to maintain a substantially constant skew angle while moving the head 26 radially across the disk 22 to achieve a substantially constant track density. In an alternative embodiment, the control signal applied to the secondary actuator 34 is adjusted to vary the skew angle while moving the head radially across the disk to achieve a variable track density. FIG. 9 shows an example embodiment wherein the track density is decreased near the outer diameter of the disk 22 where servo errors (track misregistration errors) are amplified due to the increase in linear velocity, windage, and disk flutter effects.

Figure 1:
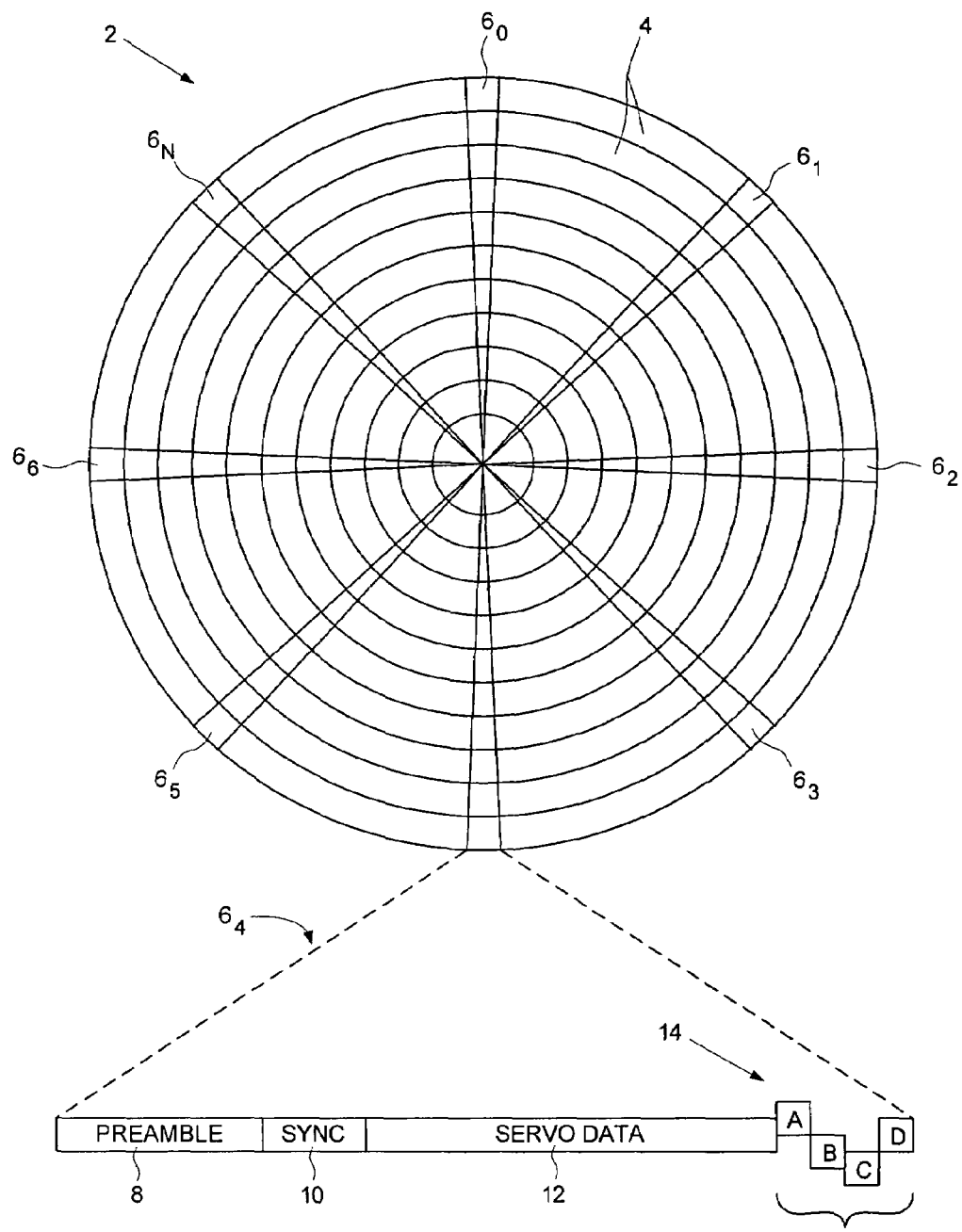
FIG. 1 shows a prior art format for a disk comprising a plurality of concentric, radially-spaced data tracks, and a plurality of embedded servo sectors.
Figure 2A:
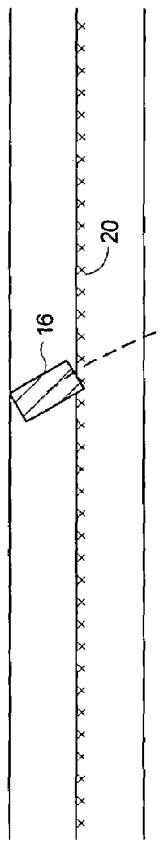
FIGS. 2A-2C illustrate a problem when servo writing a disk using perpendicular magnetic recording wherein the skew angle of the head causes the write element to overwrite previously written servo data.
Figure 2B:
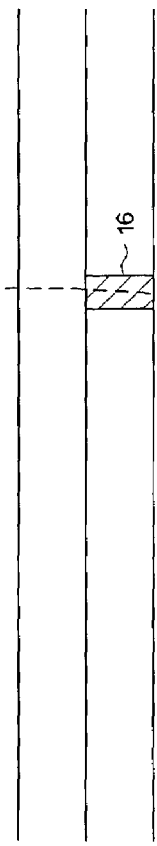
Figure 2C:
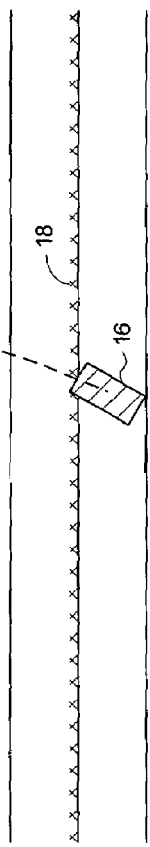

The target skew angle may be adjusted to improve the servo writing performance of each particular servo writing process. For example, in one embodiment the target skew angle is selected to minimize the overwrite effect (FIGS. 2A-2C) when servo writing using perpendicular magnetic recording which may be implemented externally (external servo writer) or internally (self servo writing). In addition, self servo writing may be implemented by propagating the servo sectors or it may be implemented by servoing on seed tracks written by an external servo writer. For example, an external servo writer may write a plurality of "seed" servo sectors or spiral tracks that are used for servoing during self-servo writing.

We claim:

1. A disk drive comprising:
   (a) a disk;
   (b) an actuator arm;
   (c) a head coupled to a distal end of the actuator arm, wherein the head comprises a read element and a write element;
   (d) a voice coil motor (VCM) for rotating the actuator arm about a pivot to actuate the head radially over the disk;
   (e) a secondary actuator for adjusting a skew angle for the head; and
   (f) control circuitry for writing a plurality of servo sectors to the disk to define a plurality of data tracks by:
      controlling the VCM to move the head radially across the disk;
      controlling the secondary actuator to achieve a desired skew angle for the head; and
      using the write element to write the servo sectors to the disk,
      wherein the control circuitry controls the secondary actuator so that the write element leads the read element from a first diameter of the disk toward a second diameter of the disk across substantially the entire radius of the disk.

2. The disk drive as recited in claim 1, wherein the disk controller uses the read element to read previously written servo data in a first servo track to generate servo control information for controlling the VCM to position the write element over a second servo track.

3. A method of servo writing a plurality of servo sectors to a disk of a disk drive to define a plurality of data tracks, the disk drive comprising the disk, an actuator arm, a head coupled to a distal end of the actuator arm, wherein the head comprises a read element and a write element, a voice coil motor (VCM) for rotating the actuator arm about a pivot to actuate the head radially over the disk, and a secondary actuator for adjusting a skew angle for the head, the method comprising:
   (a) rotating the actuator arm about the pivot to move the head radially across the disk;
   (b) controlling the secondary actuator to vary a skew angle for the head to achieve a variable data track density; and
   (c) using the write element to write the servo sectors to the disk.

4. The method as recited in claim 3, wherein control circuitry internal to the disk drive rotates the actuator arm about the pivot by controlling the VCM and controls the secondary actuator to vary the skew angle for the head.

5. A disk drive comprising:
   (a) a disk;
   (b) an actuator arm;
   (c) a head coupled to a distal end of the actuator arm, wherein the head comprises a read element and a write element;
   (d) a voice coil motor (VCM) for rotating the actuator arm about a pivot to actuate the head radially over the disk;
   (e) a secondary actuator for adjusting a skew angle for the head; and
   (f) control circuitry for writing a plurality of servo sectors to the disk to define a plurality of data tracks by:
      controlling the VCM to move the head radially across the disk;
      controlling the secondary actuator to vary a skew angle for the head to achieve a variable data track density; and
      using the write element to write the servo sectors to the disk.

6. A disk drive comprising:
   (a) a disk;
   (b) an actuator arm;
   (c) a head coupled to a distal end of the actuator arm, wherein the head comprises a read element and a write element;
   (d) a voice coil motor (VCM) for rotating the actuator arm about a pivot to actuate the head radially over the disk;
   (e) a secondary actuator for adjusting a skew angle for the head; and
   (f) control circuitry for writing a plurality of servo sectors to the disk to define a plurality of data tracks by:
      controlling the VCM to move the head radially across the disk;
      controlling the secondary actuator to achieve a desired skew angle for the head; and
      using the write element to write the servo sectors to the disk,
      wherein:
      the read element is separated from the write element along the length of a servo track forming a read/write gap; and
      the control circuitry calibrates a control signal applied to the secondary actuator and a corresponding change in the skew angle of the head by measuring the read/write gap.

7. The disk drive as recited in claim 6, wherein the control circuitry adjusts a control signal applied to the secondary actuator to maintain a substantially constant skew angle while moving the head radially across the disk to achieve a substantially constant track density.

8. The disk drive as recited in claim 6, wherein the control circuitry adjusts a control signal applied to the secondary actuator to vary the skew angle while moving the head radially across the disk to achieve a variable track density.

9. A disk drive comprising:
   (a) a disk;
   (b) an actuator arm;

(c) a head coupled to a distal end of the actuator arm, wherein the head comprises a read element and a write element;
(d) a voice coil motor (VCM) for rotating the actuator arm about a pivot to actuate the head radially over the disk;
(e) a secondary actuator for adjusting a skew angle for the head; and
(f) control circuitry for writing a plurality of servo sectors to the disk to define a plurality of data tracks by:
controlling the VCM to move the head radially across the disk;
controlling the secondary actuator to achieve a desired skew angle for the head; and
using the write element to write the servo sectors to the disk,
wherein:
the read element is separated from the write element along the length of a servo track forming a read/write gap; and
the read element is radially offset from the write element and the control circuitry measures the radial offset between the read element and the write element by measuring the read/write gap.

10. A disk drive comprising:
(a) a disk;
(b) an actuator arm;
(c) a head coupled to a distal end of the actuator arm, wherein the head comprises a read element and a write element;
(d) a voice coil motor (VCM) for rotating the actuator arm about a pivot to actuate the head radially over the disk;
(e) a secondary actuator for adjusting a skew angle for the head; and
(f) control circuitry for writing a plurality of servo sectors to the disk to define a plurality of data tracks by:
controlling the VCM to move the head radially across the disk; and
using the write element to write the servo sectors to the disk,
wherein:
the read element is separated from the write element along the length of a servo track forming a read/write gap; and
the control circuitry adjusts a control signal applied to the secondary actuator to achieve a target read/write gap.

11. A method of servo writing a plurality of servo sectors to a disk of a disk drive to define a plurality of data tracks, the disk drive comprising the disk, an actuator arm, a head coupled to a distal end of the actuator arm, wherein the head comprises a read element and a write element, a voice coil motor (VCM) for rotating the actuator arm about a pivot to actuate the head radially over the disk, and a secondary actuator for adjusting a skew angle for the head, the method comprising:
(a) rotating the actuator arm about the pivot to move the head radially across the disk;
(b) controlling the secondary actuator to achieve a desired skew angle for the head; and
(c) using the write element to write the servo sectors to the disk, wherein the secondary actuator is controlled so that the write element leads the read element from a first diameter of the disk toward a second diameter of the disk across substantially the entire radius of the disk.

12. The method as recited in claim 11, wherein the control circuitry uses the read element to read previously written servo data in a first servo track to generate servo control information for controlling the VCM to position the write element over a second servo track.

13. A method of servo writing a plurality of servo sectors to a disk of a disk drive to define a plurality of data tracks, the disk drive comprising the disk, an actuator arm, a head coupled to a distal end of the actuator arm, wherein the head comprises a read element and a write element, a voice coil motor (VCM) for rotating the actuator arm about a pivot to actuate the head radially over the disk, and a secondary actuator for adjusting a skew angle for the head, wherein the read element is separated from the write element along the length of a servo track forming a read/write gap, the method comprising:
(a) rotating the actuator arm about the pivot to move the head radially across the disk;
(b) controlling the secondary actuator to achieve a desired skew angle for the head;
(c) using the write element to write the servo sectors to the disk; and
(d) calibrating a control signal applied to the secondary actuator and a corresponding change in the skew angle of the head by measuring the read/write gap.

14. The method as recited in claim 13, wherein the step of controlling the secondary actuator comprises the step of adjusting a control signal applied to the secondary actuator to maintain a substantially constant skew angle while moving the head radially across the disk to achieve a substantially constant track density.

15. A method of servo writing a plurality of servo sectors to a disk of a disk drive to define a plurality of data tracks, the disk drive comprising the disk, an actuator arm, a head coupled to a distal end of the actuator arm, wherein the head comprises a read element and a write element, a voice coil motor (VCM) for rotating the actuator arm about a pivot to actuate the head radially over the disk, and a secondary actuator for adjusting a skew angle for the head, wherein the read element is separated from the write element along the length of a servo track forming a read/write gap, the method comprising:
(a) rotating the actuator arm about the pivot to move the head radially across the disk;
(b) controlling the secondary actuator to achieve a desired skew angle for the head;
(c) using the write element to write the servo sectors to the disk, wherein the read element is radially offset from the write element; and
(d) measuring the radial offset between the read element and the write element by measuring the read/write gap.

16. A method of servo writing a plurality of servo sectors to a disk of a disk drive to define a plurality of data tracks, the disk drive comprising the disk, an actuator arm, a head coupled to a distal end of the actuator arm, wherein the head comprises a read element and a write element, a voice coil motor (VCM) for rotating the actuator arm about a pivot to actuate the head radially over the disk, and a secondary actuator for adjusting a skew angle for the head, wherein the read element is separated from the write element along the length of a servo track forming a read/write gap, the method comprising:
(a) rotating the actuator arm about the pivot to move the head radially across the disk;
(b) controlling the secondary actuator to achieve a target read/write gap for the head; and
(c) using the write element to write the servo sectors to the disk.

* * * * *